United States Patent

Grassl et al.

[11] 4,359,274
[45] Nov. 16, 1982

[54] SINGLE REFLEX CAMERA WITH OPTOELECTRONIC DISTANCE METER

[75] Inventors: Hans-Peter Grassl, Zorneding; Peter Kleinschmidt; Heiner Herbst, both of Munich; Hans-Jorg Pfleiderer, Zorneding, all of Fed. Rep. of Germany

[73] Assignee: Siemens Aktiengesellschaft, Berlin & Munich, Fed. Rep. of Germany

[21] Appl. No.: 253,404

[22] Filed: Apr. 13, 1981

[30] Foreign Application Priority Data

May 14, 1980 [DE] Fed. Rep. of Germany ....... 3018588

[51] Int. Cl.³ .............................................. G03B 13/18
[52] U.S. Cl. ...................................... 354/25; 354/31; 354/152
[58] Field of Search ................. 354/25 R, 25 A, 25 P, 354/25 N, 31, 31 F, 23 R, 56, 155, 152, 195, 162

[56] References Cited

U.S. PATENT DOCUMENTS 4,104,652 8/1978 Hosoe et al. ........................ 354/25
4,290,693 9/1981 Stein ................................. 354/25 X Primary Examiner—William B. Perkey
Attorney, Agent, or Firm—Hill, Van Santen, Steadman, Chiara & Simpson

[57] ABSTRACT

A photographic or electronic camera is disclosed having an optoelectronic distance meter. Linear sensors are provided and by way of partial aperture diaphragms associated with a lens first and second images are created and projectd onto the image sensors. An evaluating circuit, in dependence upon varied position displacements of the sensor signals, determines a maximum correlation between the signals and an associated position displacement with a corresponding electrical value corresponding to distance. A stringing mirror deflects the path of rays either into the view finder or to an image plane for picture taking. The swinging mirror has apertures positioned to permit the first and second bundles of rays to pass therethrough. Deflection elements are attached to the swinging mirror and are positioned to direct the partial bundles of rays passing through the apertures such that the images are projected onto the image sensors.

7 Claims, 2 Drawing Figures

SINGLE REFLEX CAMERA WITH OPTOELECTRONIC DISTANCE METER

BACKGROUND OF THE INVENTION

The invention concerns a photographic or electronic camera with an optoelectronic distance meter. Two linear image sensors are provided each of which have a plurality of sensor elements. Two optical devices are provided associated with a lens of the camera and which create two partial aperture diaphragms for the projection of first and second bundles of rays which are projected onto the image sensors and correspond to two images obtained from the object being viewed. An evaluating circuit is provided which in dependence upon varied position displacements of sensor signals obtained from the one image sensor with respect to sensor signals obtained from the other image sensor determines a maximum correlation between these signals and an associated position displacement with a corresponding electrical value.

A photographic camera of this kind whereby the two images required of the object, whose distance is to be determined, are obtained via the partial aperture diaphragms of the camera lens, is known from U.S. patent application Ser. No. 20,812, filed Mar. 13, 1979, now U.S. Pat. No. 4,304,474 incorporated herein by reference. Arrangements for the optoelectronic distance measurement with two linear image sensors are also described in U.S. Ser. No. 20,813 filed Mar. 15, 1979 now U.S. Pat. No. 4,290,693 and also in U.S. patent application Ser. No. 69,788, filed Aug. 27, 1979, now U.S. Pat. No. 4,320,302; 168,648, filed July 11, 1980, now U.S. Pat. No. 4,334,150; and 172,084, filed July 24, 1980, all incorporated herein by reference. Accordingly, the devices for the derivation of the two images in each case are designated very generally as optical devices which, for example, can consist of two partial aperture diaphragms of a lens or of two separate lenses which fulfill the same functions.

As proceeds from the patent applications identified, the sensor elements consist of photodiodes, MIS capacitors, or of photodiodes to which in each case MIS capacitors are associated. Within individual time intervals which also are designated as integration times, in each case optically generated charge carriers collect in the sensor elements from which then the sensor signals are derived. In the case of the arrangement according to U.S. patent application Ser. Nos. 20,813 and 20,812, there proceeds an analog processing of the sensor signals, while the arrangements according to the other above named patent applications differ from this to the extent that the sensor signals are first digitalized before their further processing.

SUMMARY OF THE INVENTION

The invention is based upon the problems of providing a single reflex camera equipped with an optoelectronic distance meter whereby the optical components required for the distance meter are designed such that they do not impair the path of rays of the camera either in the viewfinder portion or between the lens and the focal plane. This problem is solved according to the invention by providing a swinging mirror which in a first position deflects the path of rays from the lens selectively into a viewfinder for single reflex operation, and in a second position permits the rays to pass to an image plane for picture-taking. The swinging mirror has two apertures which are positioned to locate the partial aperture diaphragms. Deflection elements are attached to the swinging mirror which are positioned in a path of the partial bundles of rays passing through the apertures so as to project the images onto the image sensors.

The advantage attainable with the invention consists, in particular, in that the mounting of the optoelectronic distance meter brings about only a slight alteration of the conventional structure of a single reflex camera.

DESCRIPTION OF THE PREFERRED EMBODIMENTS

Figure 1:
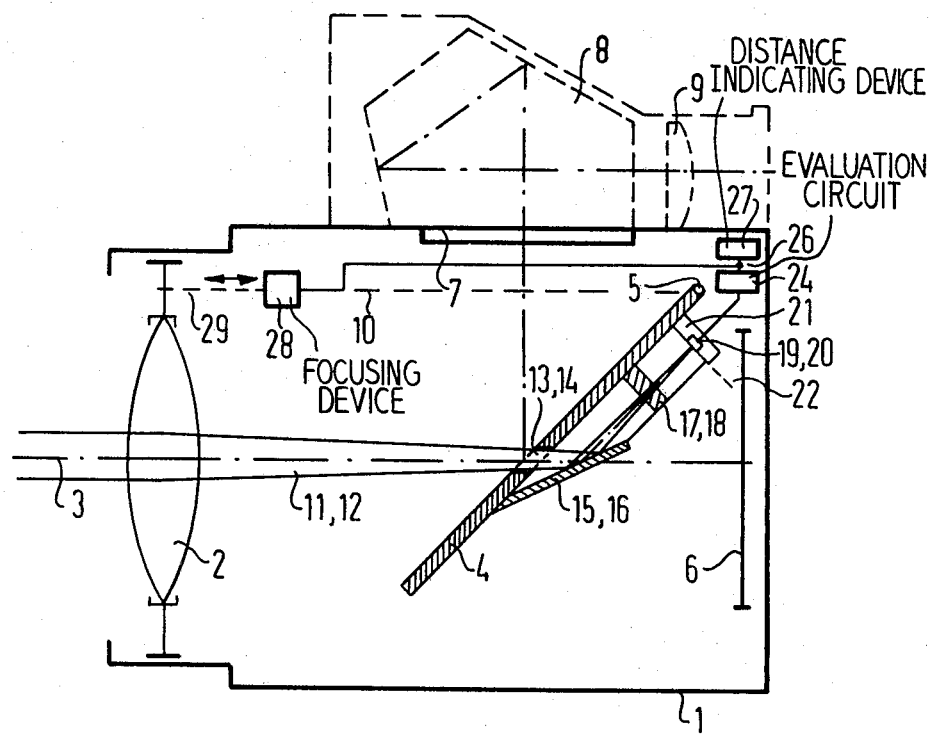
FIG. 1 is a schematic depiction of a single reflex camera designed according to the invention.

In FIG. 1, a single reflex camera is depicted schematically with a housing 1 and a lens 2. A bundle of rays entering through the lens 2 derived from an object to be photographed is thereby indicated by means of the ray coinciding with the optical axis 3. A swinging mirror 4, which is rotatably mounted around an axis 5, can be brought to the illustrated downward position in which it is located in the path of rays between the lens 2 and a focal plane 6 at which, for example, a photographic film, or, in the case of an electronic camera, a two-dimensional image sensor is provided. The mirror 4 deflects the entering bundle of rays 3 in a direction toward a viewfinder adjustment disk 7. This is located in a plane equivalent to the focal plane 6 so that a picture or scene image is sharply imaged on it. The scene image can further be reflected via a so-called pentaprism 8 to a viewing eyepiece 9 in which it then appears upright and unreversed. After the scene search and the adjustment of the distance of the lens 2 from the focal plane 6 to such a value that the object to be photographed is sharply imaged on the focal plane 6, then the swinging mirror is brought into the position 10 which is indicated with a broken line, so that the bundle of rays 3 proceeds to the focal plane 6 and the photographic film is exposed or, respectively, is optoelectronically scanned.

The partial bundle of rays 11, 12 enter through two partial aperature diaphragms P1, P2 of the lens 2, which in FIG. 1 coincide since they lie in front of, or respectively, behind the drawing plane proceeding through the optical axis. These rays 11, 12 are defined by means of two correspondingly provided apertures 13, 14 of the folding or swinging mirror 4. The partial bundles of rays are permitted to pass through the recesses or apertures 13, 14 and meet on two small deflection mirrors 15, 16, which are fastened on the swinging mirror 4, by which they are reflected in a direction parallel to the plane of the swinging mirror. In the path of rays of the deflected partial bundle of rays, there lie two deflection prisms 17, 18 which in a practical manner are fastened on the underside of the swinging mirror 4. By these prisms, the partial bundles of rays are deflected such that the images of the object obtained via the partial aperture diaphragms P1, P2 which otherwise would overlap mutually are separate from one another. Two linear image sensors 19, 20 are provided on a carrier body 21 which is connected with the swinging mirror 4. They are arranged such that their sensor elements are located in a common sensor line which runs perpendicular to the drawing plane in FIG. 1. They further lie in a plane 22 which is equivalent to the focal plane 6, on which the object is sharply imaged in the case of a correct adjustment of the lens 2. The carrier body 21 consists in a practical manner of a doped semiconductor material, for example silicon, in which the individual sensor elements are integrated.

Figure 2:
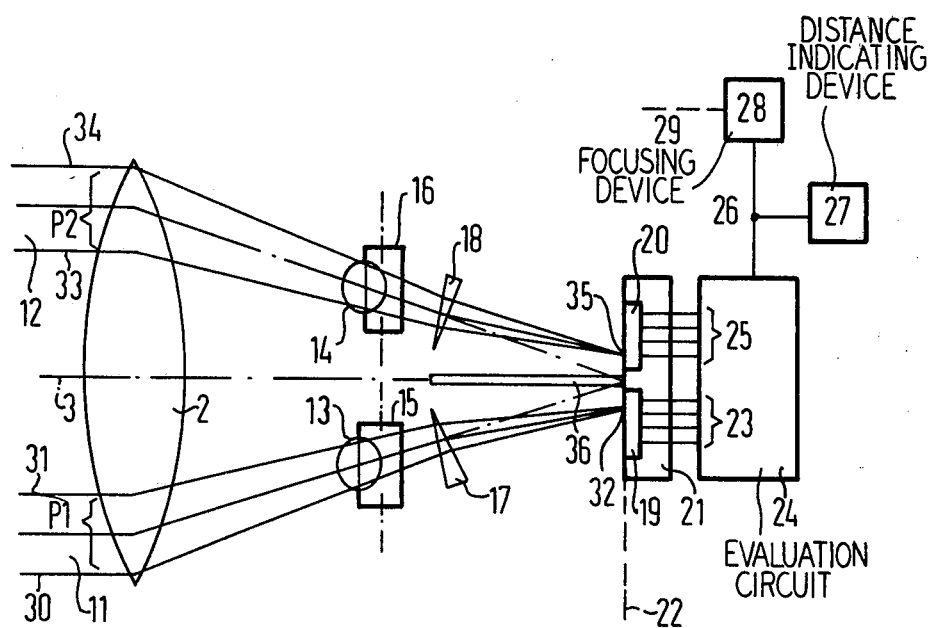
FIG. 2 shows the path of rays from above the camera according to FIG. 1, but without certain structural elements.

In FIG. 2, the flattened path of rays of the partial bundles of rays 11 and 12 are depicted as seen from the direction of the viewfinder adjustment disk 7. The swinging mirror 4 is left out and the deflection of the partial bundle of rays in the deflection mirrors 15, 16 is not considered.

Each of the image sensors contains a series or row of sensor elements which in each case consist of photodiodes, MIS capacitors, or of photodiodes and MIS capacitors which are associated to the image sensors. The structure and the manner of operation of such image sensors are described for example in U.S. application Ser. No. 168,648. The outputs of the sensor elements of the image sensor 19 are connected with parallel inputs 23 of an evaluating circuit 24, while the outputs of the sensor elements of the image sensor 20 are guided to the parallel inputs 25 of circuit 24. An output 26 of the evaluating circuit is connected with a device 27 which indicates the distance of the object as explained in the foregoing identified patent applications. On the other hand, the output 26 can also be connected with a focusing device 28, which, in dependence upon a signal which is measurable at 26, adjusts the distance of the lens 2 from the focal plane 6 and the equivalent planes 22 and 7 which is required for focusing by means of an activation element indicated by the broken line 29. The evaluating circuit 24 can advantageously be integrated in the doped semiconductor body 21.

Two axis-parallel rays 30 and 31 which enter through the partial aperture diaphragm P1 meet at an image or focal point 32 of the plane 22. In the same manner, axis-parallel rays 33 and 34 which enter through P2 are imaged in the point 35 of the plane 22. The points 32 and 35 thereby correspond to an object point which is located at a very great distance from the camera 1. If its distance is smaller, then light rays proceed from it which, to the extent that they enter through the partial aperture diaphragm P1, meet in a point of the plane 22 which lies under the point 32 by a distance x in FIG. 2. On the other hand, the light rays which proceed from the object and enter through P2 meet in a point of the plane 22 which in FIG. 2 lies displaced from the point 35 by a distance y. The sum x+y now produces a measurement for the distance of the object from the camera 1. If one observes the entire line of the scene to be photographed which is scanned by means of the image sensors 19 and 20, then a relative displacement corresponding to the value x+y between brightness distributions which are comparable with one another and which activate the image sensors is present.

The value of the relative displacement x+y is determined in the evaluating circuit 24 in this manner. The sensor signals of the one image sensor are checked with respect to their correlation with the sensor signals of the other image sensor in dependence upon varied position displacements. The position displacement whereby the maximum correlation occurs corresponds to the desired value x+y. At the output 26, an electrical value is measurable which corresponds to this value and thus to the distance of the object. The manner of operation of such an evaluating circuit is, for example, described in U.S. application Ser. Nos. 168,648; 20,813; and 20,812.

In the case where a focusing device 28 is used, the lens 2 does not need to be set to the distance "infinite" before each distance measurement or focusing adjustment. Proceeding from the position in each case of the lens, then the value x+y represents a measurement for the deviation of the distance of the object from the distance to which the lens 2 is just then set. The electrical value measurable at 22 thereby corresponds to the required lens adjustment with which a sharp imaging of the object is attained.

Advantageously, a screen 36 which is fastened on the underside of the swinging mirror 4 serves for the separation of the images obtained via the partial aperture diaphragms P1 and P2.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A photographic or electronic camera with an opto-electronic distance meter, comprising:
   two linear image sensors each having a plurality of sensor elements;
   a lens in a path of rays from an object, and two partial aperture diaphragms for creating first and second bundles of rays corresponding to two images obtained from the object, said images being projected on the two linear image sensors;
   an evaluating circuit means which in dependence upon varied position displacements of sensor signals obtained from the one image sensor with respect to sensor signals obtained from the other image sensor determines a maximum correlation between these signals and an associated position displacement with a corresponding electrical value being output;
   a swinging mirror which in a first position deflects the path of rays from the lens selectively into a view finder for single reflex operation, and in a second position permits the rays to pass to an image plane for picture-taking;
   said swinging mirror having two apertures which are positioned to locate the partial aperture diaphragms and permit the first and second bundles of rays to pass therethrough;
   deflection element means comprising deflecting mirrors attached in a fixed position to the swinging mirror which is positioned in a path of these first and second partial bundles of rays passing through the apertures so as to project the images onto the image sensors, and said image sensors are integrated in a doped semiconductor body which is fastened on the swinging mirror.

2. A photographic or electronic camera according to claim 1 wherein the deflection element means further comprises deflecting prisms arranged after the deflecting mirrors.

3. A photographic or electronic camera according to claim 1 wherein the evaluating circuit means is integrated in the doped semiconductor body.

4. A photographic or electronic camera according to claim 1 wherein a device means which indicates a distance of the object is connected after the evaluating circuit means.

5. A photographic or electronic camera according to claim 1 wherein a focusing device is connected after the evaluating circuit means.

6. A photographic or electronic camera according to claim 1 wherein a screen is positioned between the image sensors so as to separate the first and second partial bundles of rays from one another.

7. A single reflex camera, comprising:
- a lens and an optical plane for picture-taking arranged in a line with a path of rays passing through the lens;
- first and second partial aperture diaphragms for creating first and second partial bundles of rays corresponding to first and second images of the object;
- a viewfinder;
- a swinging mirror which in a first position deflects the path of rays to the viewfinder for single reflex operation, and in a second position permits the path of rays to pass unhindered to the focal plane for picture-taking;
- first and second apertures in the swinging mirror which in the first position of the mirror are in line with the first and second partial bundles of rays;
- deflection means directly attached in a fixed position to a back side of the swinging mirror adjacent the apertures which are positioned so as to deflect the first and second partial bundles of rays passing through the apertures to first and second sensor elements also directly attached to a back side of the swinging mirror; and
- evaluating circuit means electrically connected to the sensor elements for comparing two images projected on the sensor elements with one another so as to determine a distance of the object from the camera.

* * * * *